(12) United States Patent
Beguin et al.

(10) Patent No.: US 8,545,035 B1
(45) Date of Patent: Oct. 1, 2013

(54) COLOR-PATTERNED FRONT LIGHTS

(75) Inventors: Julien G. Beguin, San Francisco, CA (US); Jano D. Banks, Cupertino, CA (US); Kari Rinko, Helsinki (FI); Ilya D. Rosenberg, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 237 days.

(21) Appl. No.: 13/077,638

(22) Filed: Mar. 31, 2011

(51) Int. Cl.
*F21V 8/00* (2006.01)
*G09G 5/00* (2006.01)

(52) U.S. Cl.
USPC .......... 362/97.1; 362/602; 362/609; 345/156; 345/102

(58) Field of Classification Search
USPC ................ 362/97.1, 602, 607, 609, 622, 458; 345/102, 156, 204
See application file for complete search history.

(56) References Cited

U.S. PATENT DOCUMENTS

| | | | |
|---|---|---|---|
| 2006/0268197 A1* | 11/2006 | Valliath et al. | 349/96 |
| 2008/0218470 A1* | 9/2008 | Miyashita et al. | 345/102 |
| 2011/0115700 A1* | 5/2011 | Yang | 345/156 |
| 2011/0286242 A1* | 11/2011 | Ni et al. | 362/622 |
| 2012/0327683 A1* | 12/2012 | Yee | 362/602 |

* cited by examiner

*Primary Examiner* — Vibol Tan
(74) *Attorney, Agent, or Firm* — Lee & Hayes, PLLC

(57) ABSTRACT

The color patterned front light (CPFL) may be implemented by shining light through a side of a CPFL panel that is situated adjacent to and in front of a monochromic reflective display (MRD). The CPFL may direct one of red, green, blue, or white light through a rear surface of the panel and onto each of the pixels in the MRD. The pixels may be grouped in blocks, such as n-by-m or n-by-n blocks of pixels. The pixels in the block may be selectively activated by the MRD to either absorb the light or reflect the light shone on the respective pixel. By adjusting the representation of the pixels in the MRD, the block may appear to change color based on the colored light from the CPFL that is reflected outward from the display.

24 Claims, 12 Drawing Sheets

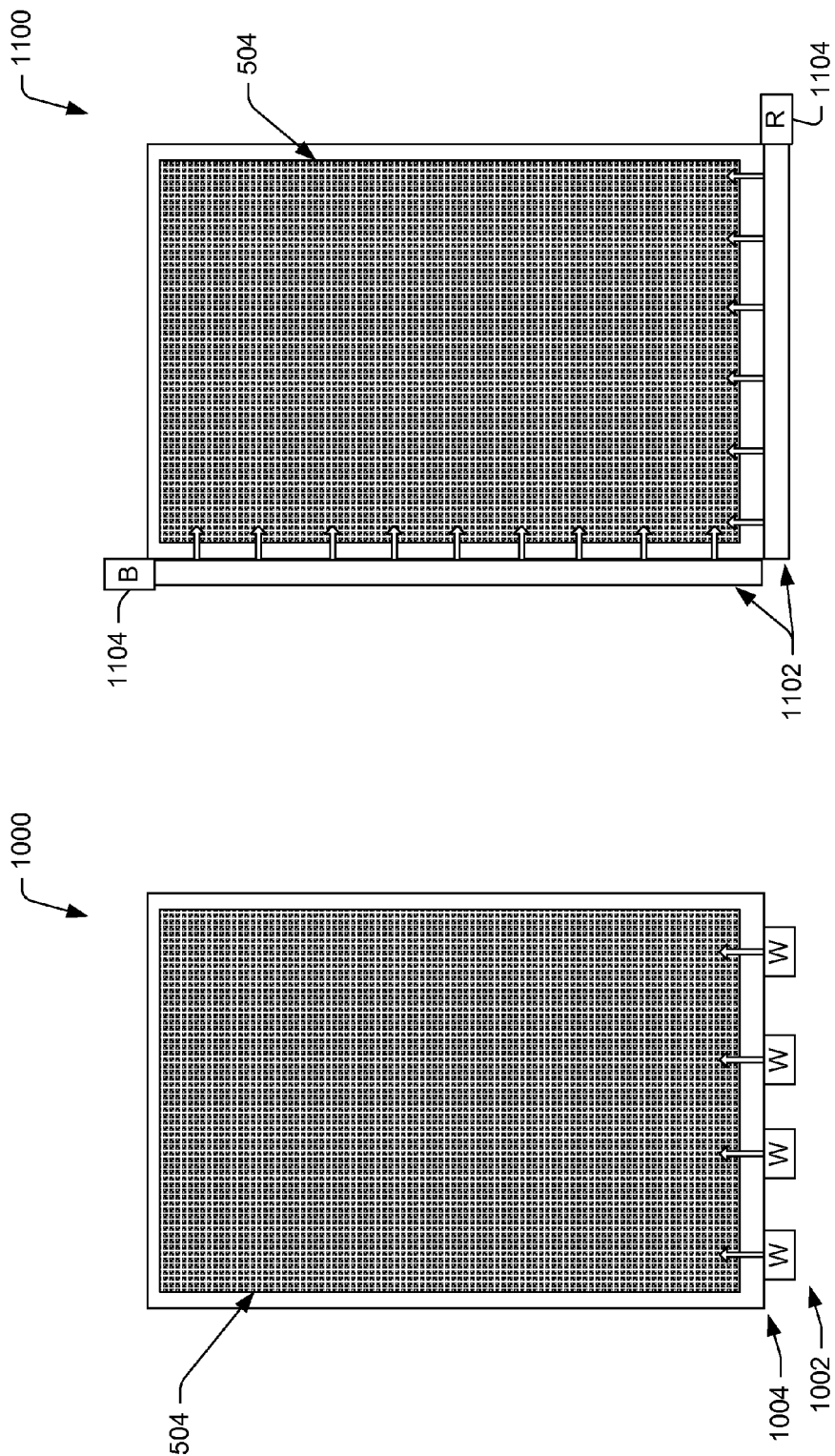

COLOR-PATTERNED FRONT LIGHTS

BACKGROUND

Monochrome reflective displays, such as electrophoretic displays, reflective liquid crystal displays (LCD), and micro-electro-mechanical (MEMS) displays, are used in a variety of electronic devices. Some electronic book (eBook) reader devices have monochrome reflective displays, which are commonly referred to as electronic paper displays because the displays mimic properties of printed materials, such as books, newspapers, and so forth. Unlike conventional backlit displays, the monochrome reflective displays rely on ambient light or a front light to enable viewing of the content on the display.

Although monochrome reflective displays have been popular for use in some applications, they have some shortcomings. In particular, monochrome reflective displays often do not accurately reproduce imagery and content that is in full color. Instead, the monochrome reflective displays reproduce the imagery and content in a grayscale or black and white representation, which may lose some information or be less visually desirable than a full color display.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 10 is a schematic diagram of an illustrative single-layer, color-patterned front light panel with an edge light guide.

FIG. 11 is a schematic diagram of an illustrative single-layer, color-patterned front light panel with multiple edge light guides.

DETAILED DESCRIPTION

Overview

This disclosure is directed to techniques and apparatuses to provide a color-patterned front light for a monochrome reflective display to generate a color display. The color-patterned front light (CPFL) may be implemented by shining light through a side of a panel that is situated adjacent to and in front of a monochromic reflective display (MRD). The CPFL may direct one or more of red, green, blue, or white light through a rear surface of the panel and onto each of the pixels in the MRD. The pixels may be grouped in blocks, such as 4×4 blocks of pixels (16 pixels total in each block) or in other quantities of pixels. The pixels in the block may be selectively activated by the MRD to either absorb the light or reflect the light shone on the respective pixel. By adjusting the representation of the pixels in the MRD, the block of pixels may appear to change color based on the colored light from the CPFL that is reflected outward from the display (via pixels rendered as white by the MRD), which may result in the block of pixels having an appearance of particular color when viewed as a whole. The CPFL may be a fixed light source and, thus, may provide the same color of light to a particular pixel during operation of the CPFL, which may be selectively absorbed or reflected by the activation and control of the MRD.

The techniques and apparatuses described herein may be implemented in a number of ways. Example implementations are provided below with reference to the following figures.

Illustrative Environment

Figure 1:
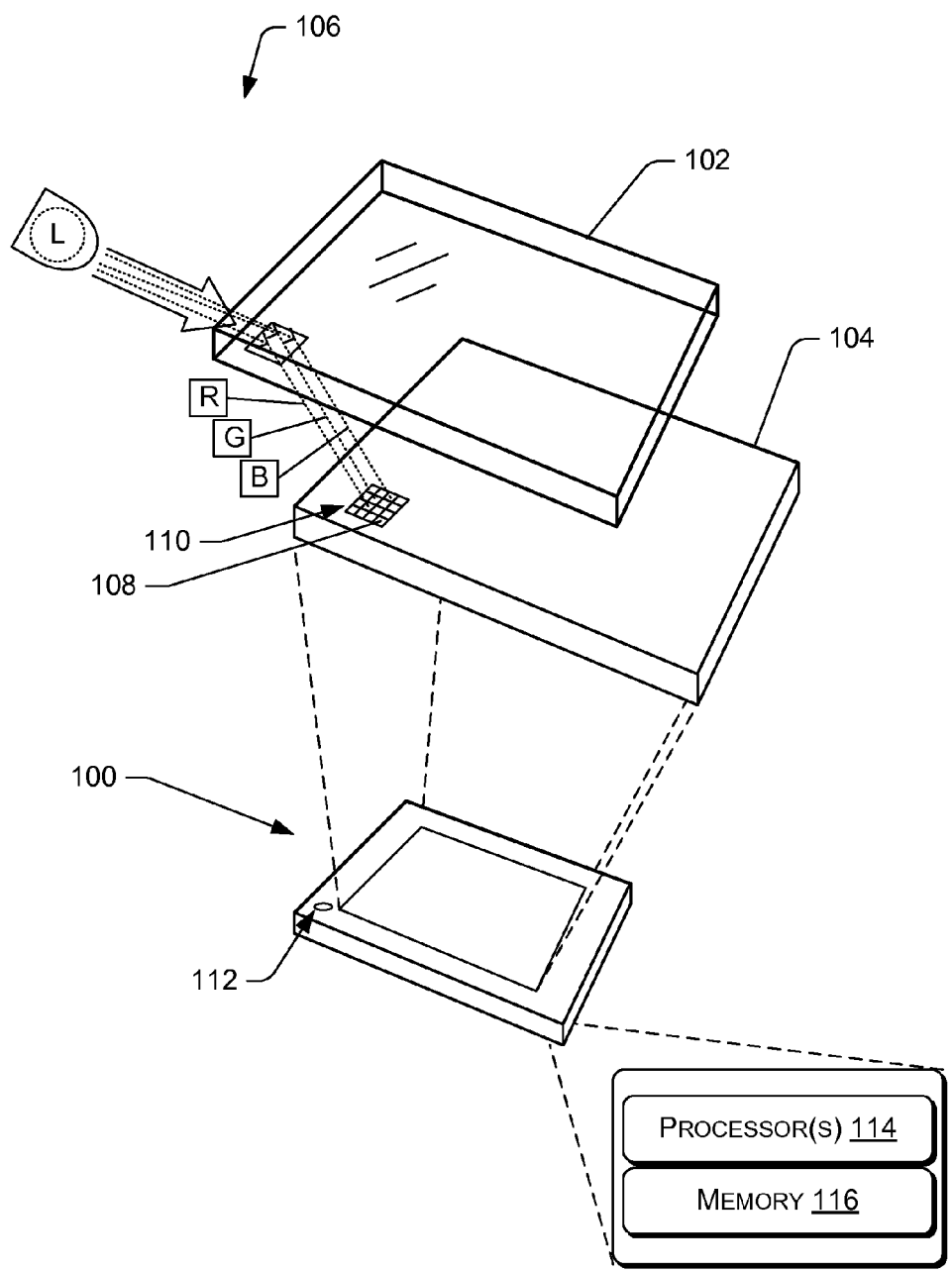
FIG. 1 is a schematic diagram of an illustrative electronic device that includes a color-patterned front light panel and a reflective display panel.

FIG. 1 shows an illustrative electronic device 100 that includes a color-patterned front light (CPFL) panel 102 and a reflective display 104. The electronic device 100 may further include a light source 106, which may be included in the CPFL panel 102 or may be separate from the CPFL panel 102.

The light source 106 may include one or more white lights, such as light emitting diodes (LEDs), which are filtered by the CPFL panel 102 to shine colored light on individual pixels 108 on the reflective display 104. In some embodiments, the light source 106 may include lights having each of the additive primary colors of red, green, and blue (RGB). Thus, the light source 106 may include one or more red LEDs, one or more green LEDs, and one or more blue LEDs. In various embodiments, the light source 106 may be implemented as white LEDs, that when passed through the CPFL panel 102, are filtered to create one of the additive primary colors RGB on a respective one of the pixels 108.

The CPFL panel 102 may include a front surface and a rear surface that is opposite the front surface and adjacent to the reflective display 104. The CPFL panel 102 may include sides that are perpendicular or substantially perpendicular to rear surface. The light source 106 may be arranged to shine light through a side of the CPFL panel 102, multiple sides of the CPFL panel, or in other locations, and ultimately exit the CPFL panel 102 through the rear surface. The light source 106 may shine collimated light or non-collimated light through the CPFL panel 102, such as light emitted from various corners of the CPFL panel 102.

In some embodiments, the CPFL panel 102 may include multiple layers. A layer may be used to redirect light from the light source 106 onto respective ones of the pixels 108 on the reflective display 104. For example, each of the additive primary colors RGB may have a respective layer associated with the color. In some embodiments, colors may share a layer, such as red and green sharing a single layer. In various embodiments, the CPFL panel 102 may be formed of a single layer that redirects light onto respective ones of the pixels 108 on the reflective display 104.

The reflective display 104 may be a monochrome reflective display, such as an electrophoretic display, a reflective liquid crystal display (LCD), a micro-electro-mechanical (MEMS) display, or the like. As such, the reflective display may be generally referred to as an electronic paper display because the display mimics properties of printed materials such as books, newspapers, and so forth.

The light reflected from the CPFL panel 102 may be directed at the pixels 108 on the reflective display 104. The pixels 108 may be arranged in blocks 110, which are described with reference to FIGS. 2 and 3.

In some embodiments, the electronic device may include a light sensor 112 to measure an amount ambient light proximate the front surface of the CPFL panel 102. In various embodiments, the light sensor 112 may measure an amount of ambient light, and then in response to the measurement, may adjust an intensity or power level of the light 106. For example, the light intensity of the light 106 may be increased when the measured ambient light is relatively high (e.g., in a well-lit room), but may be used to turn off the light 106 when the amount of ambient light makes front lighting the reflective display 104 infeasible (e.g., in direct sunlight during a sunny day). The electronic device 100 may also include one or more processors 114 and memory 116, executable by the processors 114 to store instructions to control the light 106 based on the measurements of the light sensor 112. For example, the memory may store a light controller and/or a display controller to control the operation of the light source 106 or the monochrome reflective display 104, respectively.

Figure 2:
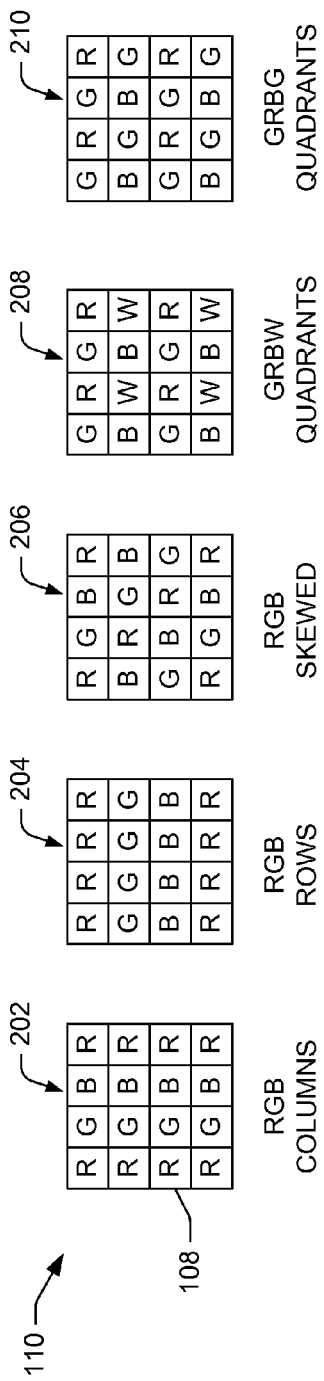
FIGS. 2 and 3 are schematic diagrams of illustrative pixel coloring configurations to color a block of pixels using the color-patterned front lights.
Figure 3:
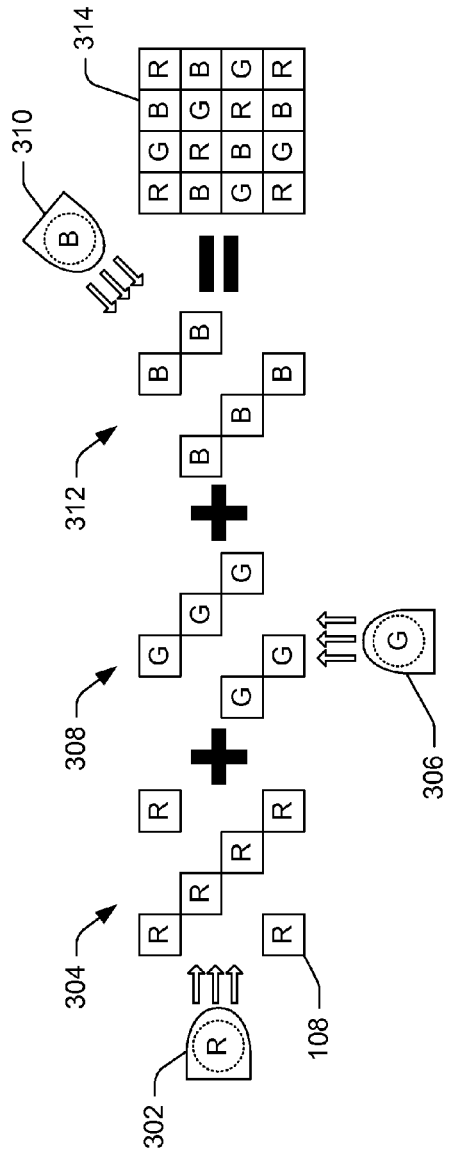

FIGS. 2 and 3 are schematic diagrams of illustrative pixel coloring configurations to enable changing a color the block 110 of pixels using the color-patterned front lights. The block 110 of pixels may include any number of pixels, such as an n-by-m block, an n-by-n block of pixels (n^2 pixels total), or other groupings of pixels. Although the blocks of pixels in FIGS. 2 and 3 show 4×4 groupings of pixels, other groupings may be used to define the blocks 110.

FIG. 2 shows illustrative color assignments of colors redirected from the CPFL panel 102 to respective ones of the pixels 108 in the reflective display 104 shown in the blocks 110. A first block 202 may include the additive primary colors assigned in columns, such that a first color may be assigned a first color (e.g., red), a second column may be assigned a second color (e.g., green), a third column may be assigned a third color (e.g., blue), and a fourth column may be assigned a repeat of one of the colors (e.g., red, green, or blue). A second block 204 shows an assignment of the colors to the pixels 108 in rows rather than columns. A third block 206 shows an assignment of the colors to the pixels 108 in a skewed pattern where the 4×4 block may include a first row having R (red), G (green), B (blue), R (red); a second row having B, R, G, B; a third row having G, B, R, G; and a fourth row having R, G, B, R. A fourth block 208 may include quadrants, such as 2×2 quadrants with each quadrant including a first row having G and R and a second row having B and W (white). The quadrants may be repeated across the fourth block 208. As shown in this block, and discussed below, an addition of a white color (white light) may be used to adjust color balance, hue, and/or an intensity of color of the block 110 when projected onto the reflective display 104. A fifth block 210 may be similar to the fourth block but replace the white pixel with a colored pixel, such as green. One or more of the sample blocks 202-210, or other possible color assignments, may be repeated by the CPFL panel 102 to assign colors to all pixels of the reflective display 104.

FIG. 3 shows a redirection of light from colored light sources to illuminate the pixels of a block. As shown in FIG. 3, a red light source 302 may shine light that is redirected by the CPFL panel 102 to red pixels 304, which are pixels 18 that are assigned to receive the red light. Similarly, a green light source 306 may shine light that is redirected by the CPFL panel 102 to green pixels 308 and a blue light source 310 may shine light that is redirected by the CPFL panel to blue pixels 312. The combination of the red pixels 304, the green pixels, 308 and the blue pixels 312 may fill the block 314, which may include a pattern of the third block 206 (RGB skewed) or another block configuration.

As discussed above, the reflective display 104 may control the coloration of the blocks by selectively absorbing or reflecting the colored light on the pixels 108 across the blocks 110. Light may be absorbed when the reflective display 104 renders or otherwise shows a pixel in a black state and may reflect light when the pixel is in a white state. In addition, intermediate states may be used where only part of the light is absorbed or reflected, such as in a grey state (shades of grey). Returning to FIG. 3, the reflective display 104 may render pixels 108 in such a way (black, white, and/or grey) as to make an appearance of the block 314 look red by rendering the red pixels 304 in the white state (reflecting) while coloring the other pixels in the black state (absorbing). In this example, only the red light would be reflected, and thus made visible in the block 314, making the block appear red. The reflective display 104 may change the color of the block 314 by modifying the state of the pixels between white and black while the color assignment of the pixels with the CPFL panel 102 remains unchanged (each pixel still receives the same color light redirected by the CPFL panel 102). Thus, each pixel in on the reflective display 104 may always have a same color projected onto the pixel, but may be selectively reflected or absorbed based on the rendering of pixels on by the reflective display 104.

By using the block 110 of pixels 108 to display a color using the techniques discussed above, the reflective display 104 may effectively operate in a reduced resolution when operating in conjunction with the CPFL 102 to display color imagery. For example, when the block is defined by 16 pixels (4×4 block), then a grey-scale resolution of 900×600 pixels may be reduced to an effective resolution of 225×150 colored blocks. In some instances, the color blocks generated using the CPFL panel 102 may be less effective in an environment having high amounts of ambient light, such as outdoors on a sunny day. In such a situation, a user may see the pixels transition from a relatively low resolution color display in a dark environment (indoors, low ambient light) to a relatively high resolution grayscale display when the user walks outside during the sunny day. Because the CPFL panel 102 may not project light of an intensity great enough to be visible with high levels of ambient light (e.g., during the sunny day), the colored blocks may make a relatively graceful transition from the colored blocks to the grayscale pixels when the user moves to the sunny location from the darker location as discussed in this example. In another example, the user or electronic device may turn off the CPFL panel 102, such as by deactivating the light source 106 to transition from the colored blocks to the grayscale pixels on the reflective display 104.

Illustrative Front-Light Panels

Figure 4:
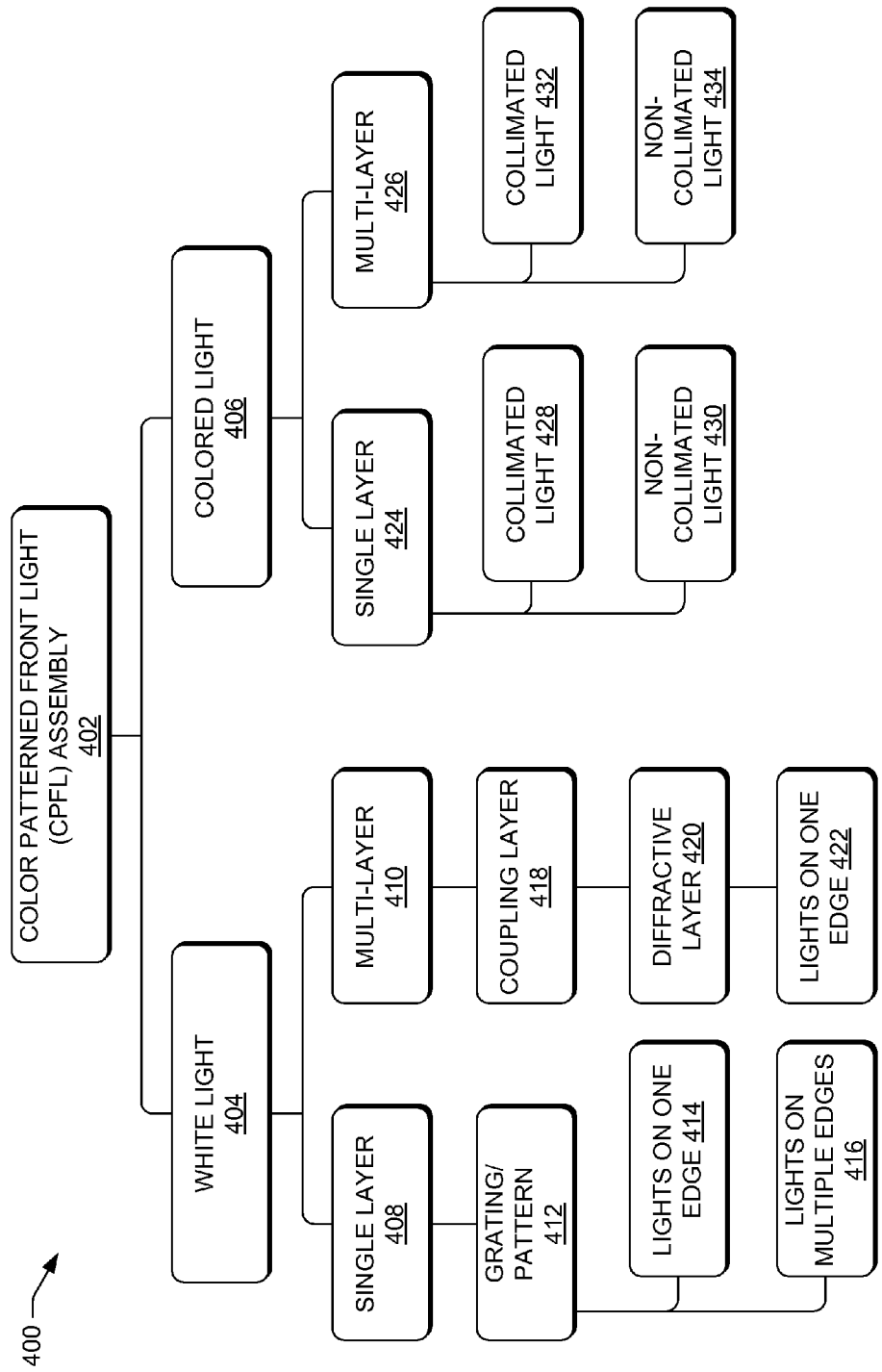
FIG. 4 is a block diagram of illustrative color-patterned front light panel configurations.

FIG. 4 is a block diagram of illustrative CPFL assembly configurations 400. The configurations 400 show a hierarchy of a CPFL assembly 402 that includes possible configurations of the light source 106 and CPFL panel 102. The configurations are initially presented by way of an overview with reference to FIG. 4, and then discussed in more detail in FIGS. 5-13.

As shown in the hierarchy, the CPFL assembly 402 may include white lights at a block 404 or colored lights at a block 406. When the CPFL assembly 402 includes the white lights at the block 404, white light may be filtered by the CPFL panel 102 into RGB colors, which are then directed (e.g., reflected, etc.) on the individual pixels of the reflective display 104. When the CPFL assembly 402 includes colored lights (e.g., RGB lights) at the block 406, then the CPFL panel 102 may direct the light at the individual pixels of the reflective display 104 without additional filters.

As shown under the block 404 representing the white lights, the CPFL assembly 402 may include a configuration where the CPFL panel 102 includes a single layer at a block 408 or multiple layers at a block 410. In the single layer configuration at the block 408, the white lights may be redirected by surface relief forms in the single layer and filtered to generate the colors (e.g., RGB). The surface relief forms that redirect and filter white light to one of red, green, or blue may be implemented together or as separate components. For example, white light may be redirected by a surface relief form towards a corresponding pixel on the reflective display, filtered to convert the white light to a color (e.g., red, green, or blue), and then shone on the respective pixel of the reflective display 104. In the multiple layer configurations at a block 410, a layer may be dedicated to redirecting one or more colors of light. For example, a layer may be dedicated to each of red, green, and blue (three layers), or a combination thereof.

Moving down hierarchy of the configurations 400 under the single layer at the block 408, the CPFL panel 102 may utilize gratings or patterns at a block 412 to convert the white light into red, green, and/or blue light (or possibly other colors) in patterns as shown in FIG. 2 defined by the blocks 110. The grating may be implemented with small grating periods that factor period variation versus light wavelengths. In some embodiments, each area of the CPFL panel 102 corresponds to one of the pixels on the reflective display 104 may include multiple gratings or gratings covering the entire surface to evenly distribute a particular color toward the respective pixel of the reflective display 104. In various embodiments, the CPFL panel 102 may use larger patterns at the block 412, which size over visible wavelengths to convert the white light to a particular color. Selection of the small grating periods versus the larger patterns may include tradeoffs of a consistency of light generated across a respective pixel on the reflective display 104 and brightness of the lights. Under the block 412, the lights may be arranged in a single edge at a block 414 or in various edges at a block 416, such as by use of light pipes or light guides that direct light from the light source into the CPFL panel 102 as collimated light.

At a block 418, the multiple layer configuration of the CPFL assembly 402 that uses white light may include a light coupling layer that provides uniform coupling, such as by utilizing blazed patterns. At a block 420, the multiple layer configuration of the CPFL panel 102 may include a diffractive layer that includes pixel gratings for each color to convert the white light into one of red, green, or blue light. At a block 422, the diffractive layer may receive light from an edge-lit light source, such as the light source described with reference to the block 414.

Turning to the colored light shown in the block 406, the colored light configurations of the CPFL assembly 402 may include a single layer at a block 424 or multiple layers at a block 426. Following the block 426, the single layer may use light sources that produce collimated light at a block 428 or non-collimated light at a block 430. The non-collimated light may be produced using various light sources positioned at corners or other locations of the CPFL panel 102. The light from these non-collimated lights may be redirected by a surface relief form positioned to receive light from one of the non-collimated lights (e.g., one of the colored lights (RBG)), which is redirected to a corresponding pixel on the reflective display 104. As discussed above, the colored light configuration of the CPFL assembly 402 may also be implemented in multiple layers, which may also use collimated light at a block 432, or in some instances, non-collimated light at a block 434.

Figure 5:
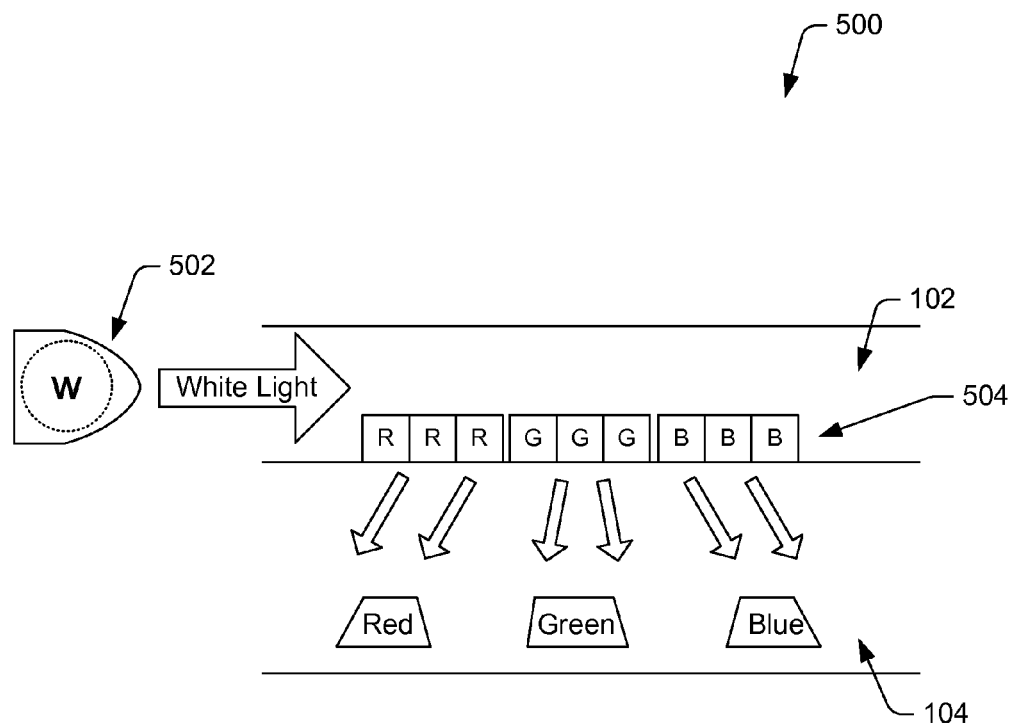
FIG. 5 is a schematic diagram of an illustrative single-layer, color-patterned front light panel using a white light source.
Figure 6:
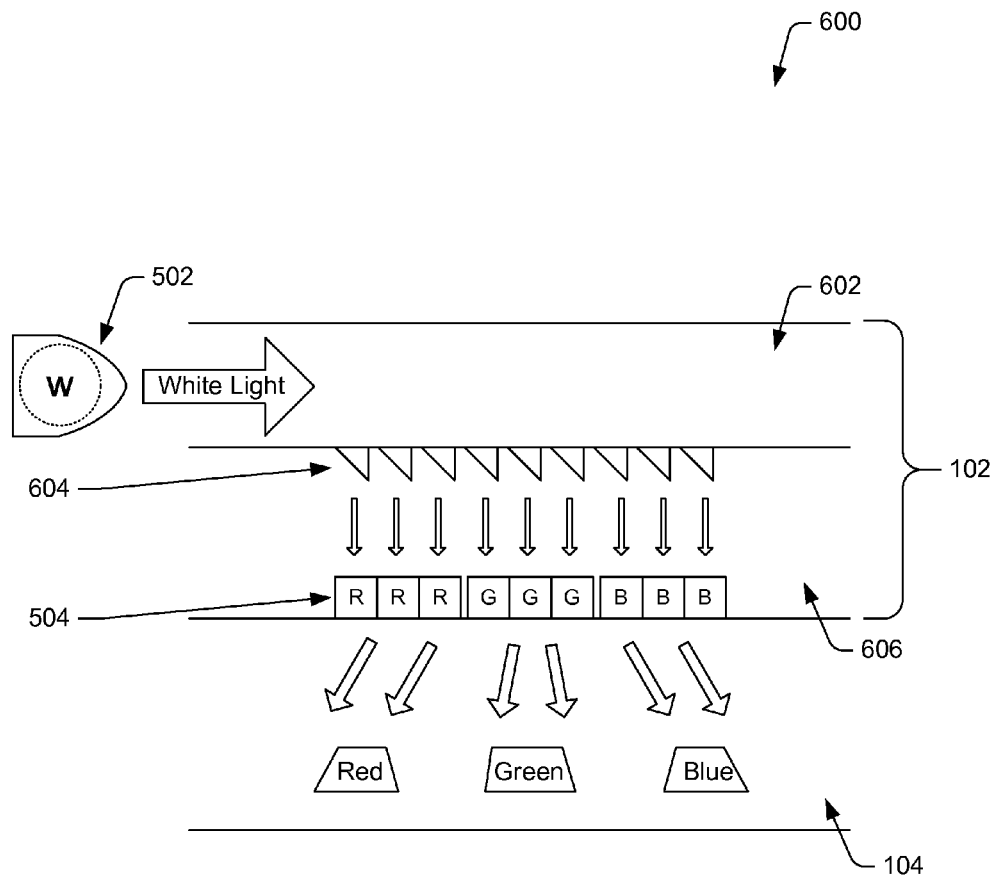
FIG. 6 is a schematic diagram of an illustrative multi-layer, color-patterned front light panel using a white light source.
Figure 7:
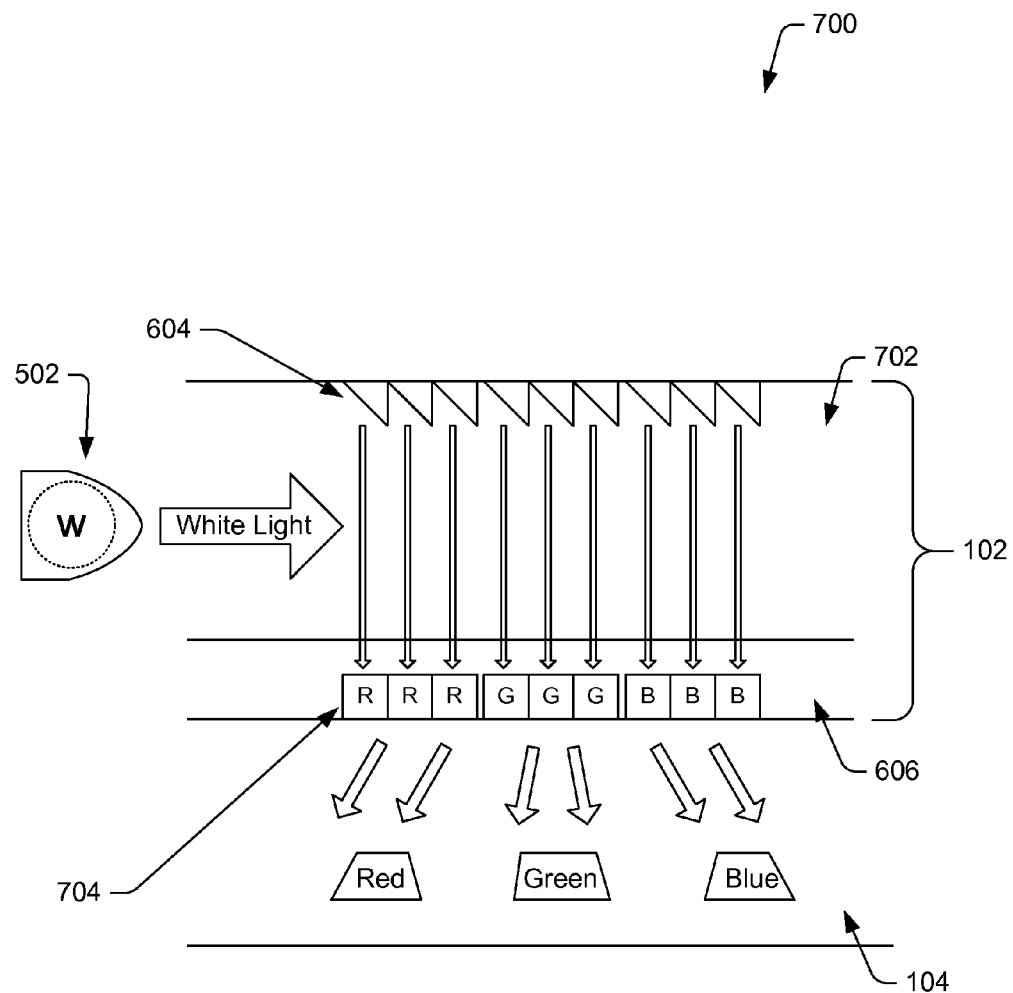
FIG. 7 is a schematic diagram of another illustrative multi-layer, color-patterned front light panel using a white light source.

FIGS. 5-7 show various configurations of the CPFL assembly 402 under the block 404 pertaining to white light configurations as discussed above with reference to FIG. 4.

FIG. 5 is a schematic diagram of an illustrative single-layer CPFL panel 500 using a white light source. The single layer CPFL panel 500 is illustrative of the configuration of the CPFL assembly 402 at the block 408 shown in FIG. 4.

As shown in FIG. 5, white light is shone from a light source 502 into the CPFL panel 102. In various embodiments, the white light passes through a grating pixel 504 (or another filter) associated with one of the RGB colors based on different periods associated with each color, and thus is converted to one of the additive primary colors RGB. The light, now colored after passing through the grating pixel 504 (or another filter), is directed on individual pixels of the reflective display 104, which may selectively absorb the light by rendering a black color on a pixel or reflect the light by producing a white color on the pixel associated with the light that passes through the CPFL panel 104.

FIG. 6 is a schematic diagram of an illustrative multi-layer CPFL panel 600 using a white light source. The multi-layer CPFL panel 600 is illustrative of the configuration of the CPFL assembly 402 at the block 410 shown in FIG. 4.

As shown in FIG. 6, white light is shone from the light source 502 through a light guide 602 in the CPFL panel 102. The light may then be redirected toward the pixels on the reflective display 104 using surface relief forms 604 in a bottom layer 606, which may be located on a back side of the CPFL panel 102, adjacent to the reflective display 104. The bottom layer 606 may be laminated to the light guide 602 such that no gap exists between respective surfaces. The surface relief forms 604 may be implemented using micro-cavity optics to redirect the light, which may be collimated light shone from a light source located proximate one edge of the CPFL panel 104. After the white light is redirected by the surface relief forms 604, it may pass through the grating pixel 504 (or another filter) associated with one of the RGB colors based on different periods associated with each color, and thus is converted to one of the additive primary colors RGB. The light, now colored after passing through the grating pixel 504 (or another filter), is directed on individual pixels on the reflective display 104, which may selectively absorb the light by producing a black color on the pixel or reflect the light by producing a white color on the pixel associated with the light that passes through the CPFL panel 104.

FIG. 7 is a schematic diagram of another illustrative multi-layer CPFL panel 700 using a white light source. The multi-layer CPFL panel 700 is also illustrative of the configuration of the CPFL assembly 402 at the block 410 shown in FIG. 4. In some embodiments, the multi-layer CPFL panel 700 may include a light guide 702 having the surface relief forms 604 without or with filled, over coated low refractive index material or other light redirecting devices on a front side of the light guide. The light may be redirected through printed color pixels 704, through the gratings 504 as discussed above, through printed color pixels in the gratings, and/or through grating pixels to convert the light to one of the additive primary colors RGB. The light, now colored after passing through the a filter, is directed on the individual pixels of the reflective display 104, which may selectively absorb the light by producing a black color on the pixel or reflect the light by producing a white color on the pixel associated with the light that passes through the CPFL panel 104.

Figure 8:
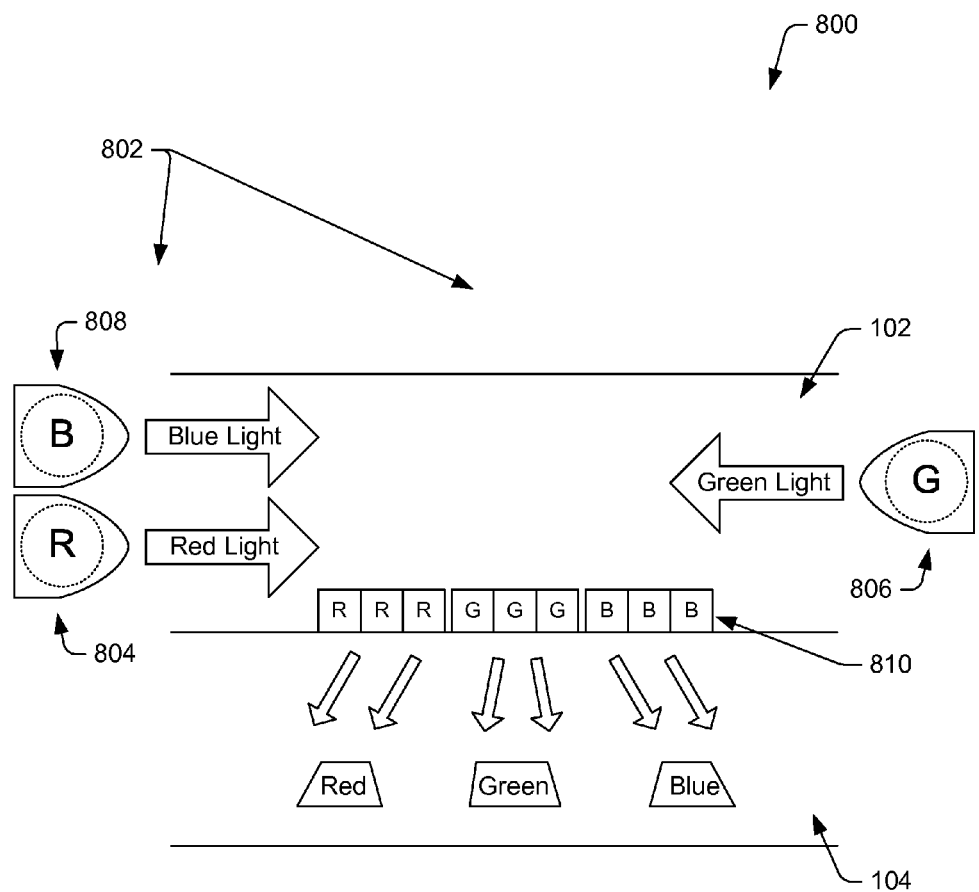
FIG. 8 is a schematic diagram of an illustrative single-layer, color-patterned front light panel using red/green/blue (RGB) light sources.
Figure 9:
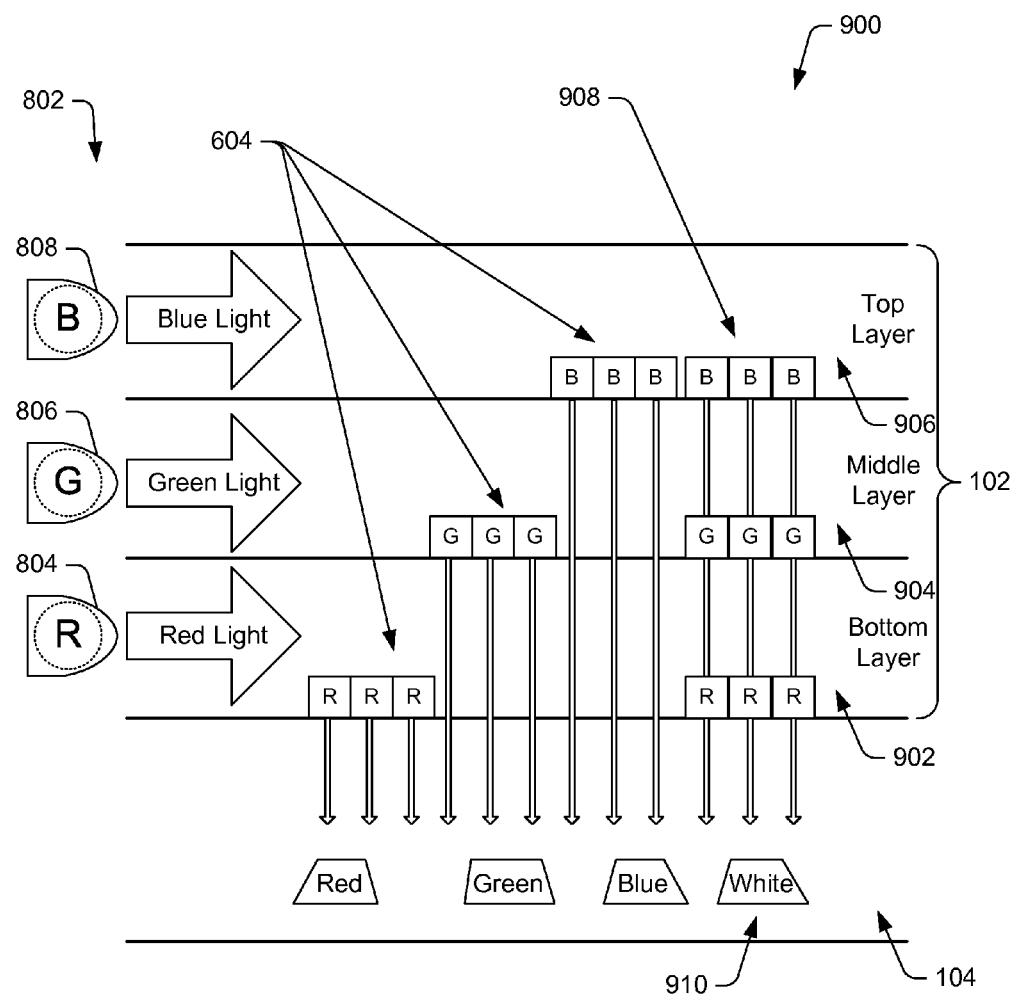
FIG. 9 is a schematic diagram of an illustrative multi-layer, color-patterned front light panel using a RGB light source.

FIGS. 8 and 9 show various configurations of the CPFL assembly 402 under the block 406 pertaining to colored light configurations as discussed above.

FIG. 8 is a schematic diagram of an illustrative single layer CPFL panel 800 using red/green/blue (RGB) light sources. The single layer CPFL panel 800 is illustrative of the configuration of the CPFL assembly 402 at the block 424 shown in FIG. 4.

As shown in FIG. 8, colored light is shone from light sources 802, which may include a red light 804, a green light 806, and a blue light 808. In some embodiments, more than one of each of the lights 802 may be used with the single layer CPFL panel 800. The light may then be redirected toward the pixels on the reflective display 104 using coupling patterns 810 for each color, which may be based on an orientation versus a light propagation direction. The colored light (one of red, green, or blue), after passing through the coupling patterns 810, is directed on the individual pixels of the reflective display 104, which may selectively absorb the light by producing a black color on the pixel or reflect the light by producing a white color on the pixel associated with the light that passes through the CPFL panel 104.

FIG. 9 is a schematic diagram of an illustrative multi-layer color patterned front light panel using a RGB light source. The multi-layer CPFL panel 900 is illustrative of the configuration of the CPFL assembly 402 at the block 426 shown in FIG. 4.

As shown in FIG. 9, colored light is shone from the light sources 802 in individual colors. Each color may be associated with a respective layer, such as a bottom layer 902 (closest to the reflective display 104), a middle layer 904, and a top layer 906 (proximate the front of the CPFL panel 102), or other possible layers (more or fewer). In some embodiments, two lights, such as the red light 804 and the blue light 808 may share a layer, thus resulting in use of two layers instead of three layers. Further, a white light and the green light 806 may share another layer, which may enable directing light of red, green, blue, or white on any of the pixels 108. The light may be redirected toward the pixels on the reflective display 104 using the coupling patterns 810 for each color, which may be based on an orientation versus a light propagation direction. The colored light (one of red, green, or blue), after passing through the coupling patterns 810, is directed on the individual pixels of the reflective display 104, which may selectively absorb the light by producing a black color on the pixel or reflect the light by producing a white color on the pixel associated with the light that passes through the CPFL panel 104.

In some embodiments, light from multiple layers may be combined to generate a combined light 908. The combined light 908 may include light redirected from the red light 804, the green light 806, and/or the blue light 808, which may result in white light 910 being emitted onto one of the pixels 108 on the reflective display 104. In various embodiments, a fourth layer may be included with a white light source. The fourth layer may redirect the white light directly onto a portion of the pixels 108 on the reflective display 104.

FIGS. 10-13 show various configurations of the CPFL assembly 402 with different light configurations as shown in the blocks 416, 422, and 428-434 in FIG. 4.

FIG. 10 is a schematic diagram of an illustrative single layer CPFL panel 1000 with an edge light guide. The single layer CPFL panel 1000 is illustrative of the configuration of the CPFL assembly 402 at the block 414 or 428 shown in FIG. 4.

In accordance with various embodiments, the single layer CPFL panel 1000 may include lights 1002 on an edge 1004 that may shine light across the single layer CPFL panel 1000. The lights 1002 may be individual lights or may be arranged with a light guide to shine collimated light across the single layer CPFL panel 1000. The single layer CPFL panel 1000 may include the grating pixels 504 across the surface of the CPFL panel 1000, which may convert the light, such as white light, to another color, such as red, green, or blue prior to the light shining on a pixel on the reflective display 104.

FIG. 11 is a schematic diagram of an illustrative single layer CPFL panel 1100 with multiple edge light guides. The single layer CPFL panel 1100 is illustrative of the configuration of the CPFL assembly 402 at the block 416 or 428 shown in FIG. 4.

In some embodiments, the single layer CPFL panel 1100 may include lights 1002 on multiple edges and may shine light across the single layer CPFL panel 1100. single layer CPFL panel 1100 may include or be configured with light guides 1102 that direct light from an associated light source 1104 to shine collimated light across the single layer CPFL panel 1100. The single layer CPFL panel 1100 may include the grating pixels 504 across the surface of the CPFL panel. The single layer CPFL panel 1100 may include two, three, or possibly more of the light guides 1102.

Figure 12:
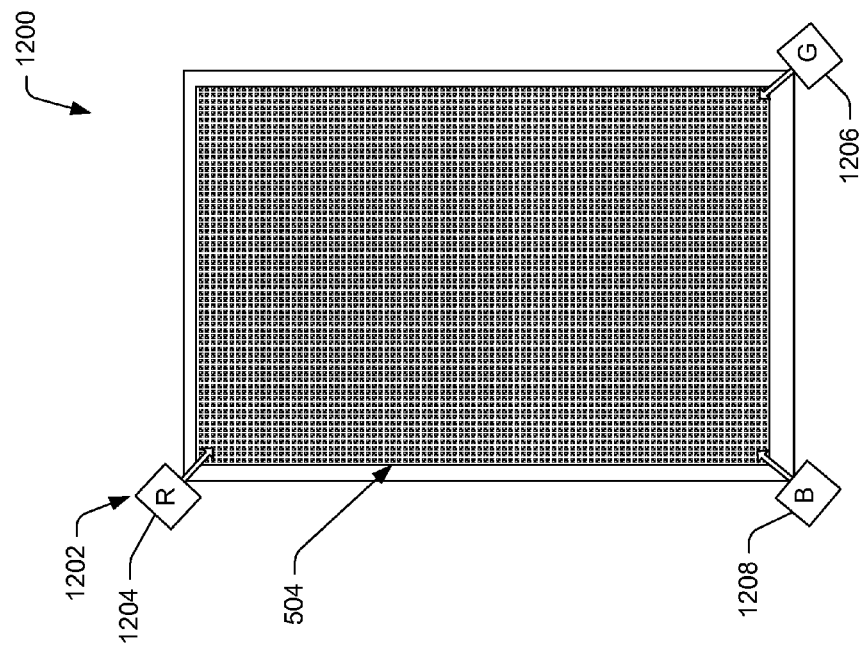
FIG. 12 is a schematic diagram of an illustrative multi-layer, color-patterned front light panel with non-collimated RGB light sources.

FIG. 12 is a schematic diagram of an illustrative multi-layer CPFL panel 1200 with non-collimated RGB light sources. The multi-layer CPFL panel 1200 is illustrative of the configuration of the CPFL assembly 402 at the block 432 shown in FIG. 4.

In various embodiments, the multi-layer CPFL panel 1200 may include RGB lights 1202, such as a red light 1204, a green light 1206, and a blue light 1208, which may be positioned at various locations proximate the CPFL panel. In some embodiments, the lights 1202 may be located at corners of the CPFL panel 1200. The lights may shine light across each of the layers of the multi-layer CPFL panel 1200, which may be redirected to respective pixels on the reflective display 104. In some embodiments, the multi-layer CPFL panel 1200 may also include a white light in a fourth location to enable emitting of white light onto one of the pixels 108 of the reflective display 104.

Figure 13:
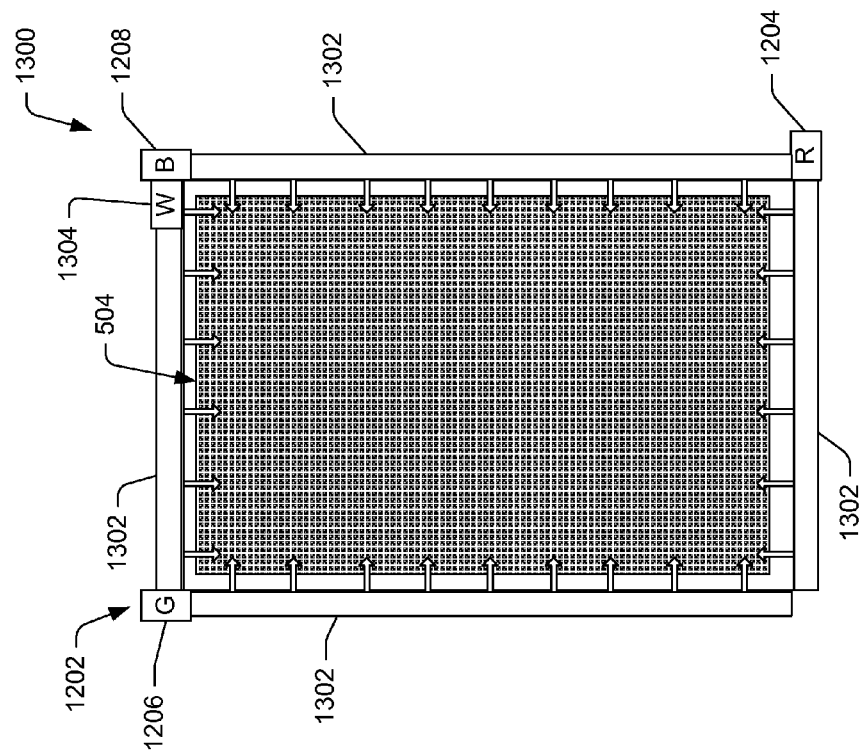
FIG. 13 is a schematic diagram of an illustrative multi-layer, color-patterned front light panel and multiple-edge light guides.

FIG. 13 is a schematic diagram of an illustrative multi-layer CPFL panel 1300 and multiple edge light guides. The multi-layer CPFL panel 1300 is illustrative of the configuration of the CPFL assembly 402 at the block 434 shown in FIG. 4.

In accordance with one or more embodiments, the multi-layer CPFL panel 1300 may include the RGB lights 1202, such as the red light 1204, the green light 1206, and the blue light 1208, which may be used to shine light into various light guides 1302. As shown in FIG. 13, a white light 1304 may also be included in an edge with one of the light guides 1302. Thus, the multi-layer CPFL panel 1300 may include any combination of light guides on any of the sides of the CPFL panel, and is not limited to the illustrative configuration shown in FIG. 13. A light guide may be associated with each of the lights to shine collimated light across the CPFL panel 1300, which may be redirected to respective pixels on the reflective display 104.

Illustrative Waveguide and Light Intensity Controls

Figure 14:
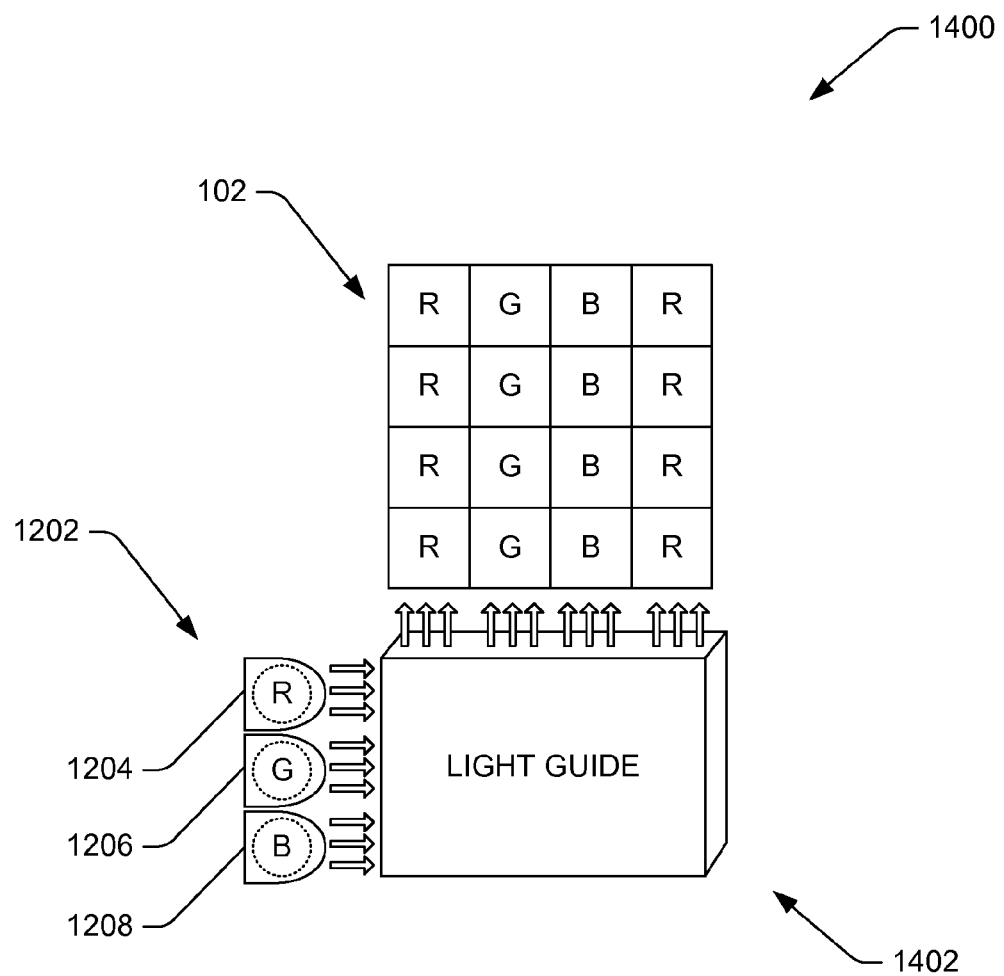
FIG. 14 is a schematic diagram of an illustrative light guide for the color-patterned front light panel.

FIG. 14 is a schematic diagram of an illustrative CPFL panel 1400 with an integrated light guide 1402. The light guide 1402 may be implemented with the CPFL panel 102 as a single unit that may or may not include the lights 1202. In some embodiments, the CPFL panel 102 may be include the integrated light guide 1400 and integrated ones of the lights 1202.

Figure 15:
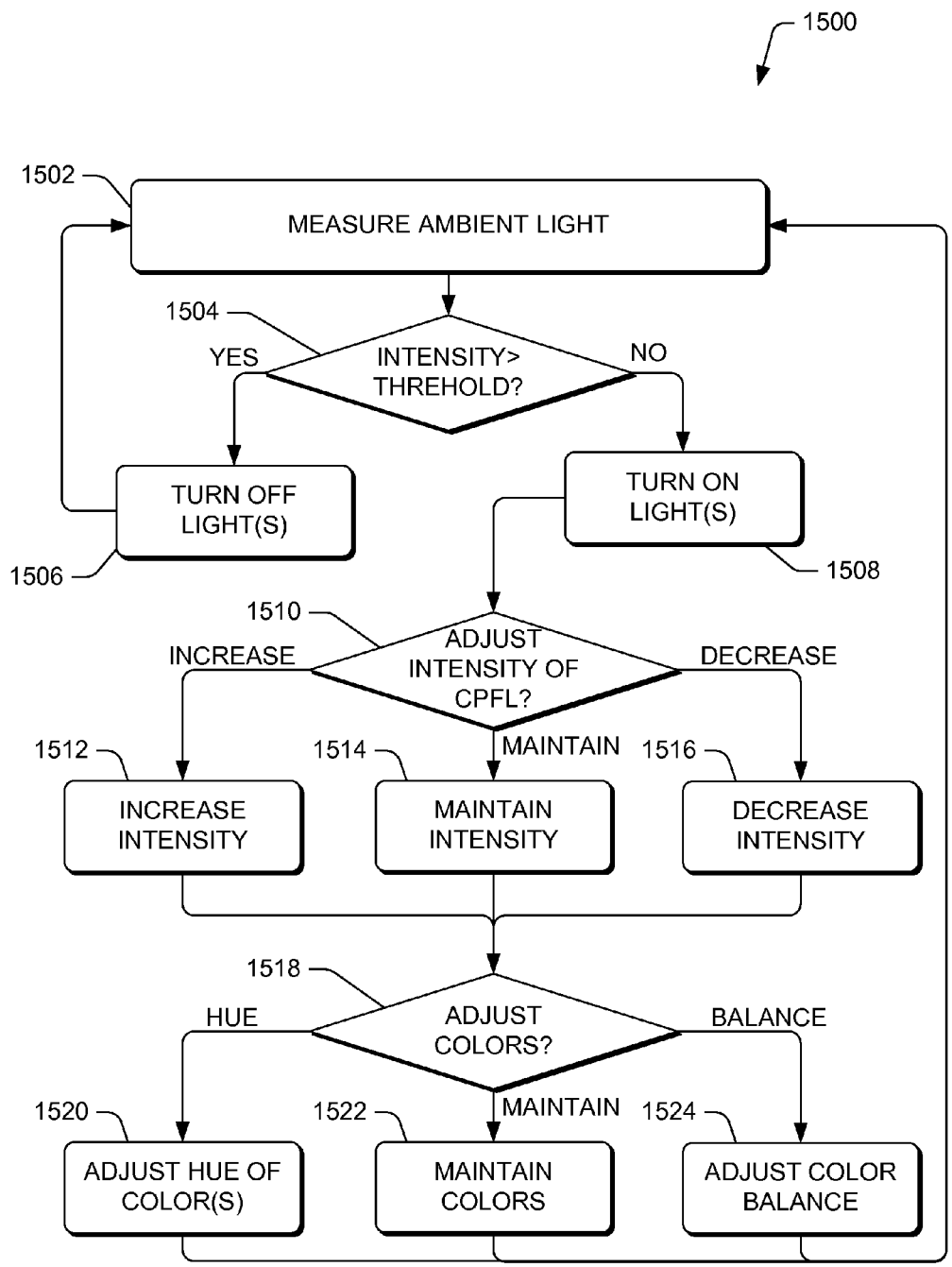
FIG. 15 is a flow diagram of an illustrative process of adjusting the color-patterned front lights in response to a measurement of ambient light.

FIG. 15 is a flow diagram of an illustrative process 1500 of adjusting an intensity of the color patterned front lights in response to a measurement of ambient light. The process 1500 is illustrated as a collection of blocks in a logical flow graph, which represent a sequence of operations that can be implemented in hardware, software, or a combination thereof. In the context of software, the blocks represent computer-executable instructions stored in memory that, when executed by one or more processors, perform the recited operations. The processors 114 and memory 116 may be hosted by the electronic device 100 that utilizes the CPFL panel 102 and reflective display 104 as shown in FIG. 1. The Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

At 1502, the light sensor 112 may measure a light intensity and/or characteristics of ambient light proximate a front of the CPFL panel 102 of the electronic device 100. The characteristics of the ambient light may enable classifying the light by a type of light (e.g., florescent light, etc) or otherwise determine characteristics that may be used to adjust a hue or color balance of the colors produced by the block 110 of the reflective display 104 operating in conjunction with the light source 106 and CPFL panel 102.

At 1504, the electronic device 100 may determine whether the measured ambient light reaches or exceeds a threshold, which when reached or exceeded, turns off the front lights used to illuminate the front of the reflective display 102. For example, when the electronic device is exposed to direct sunlight on a sunny day, it may be infeasible for the front lights to illuminate the reflective light display to produce visible colors using the blocks as described herein. The electronic device 100 may turn off the front lights at 1506 (via the route "yes") when the threshold is reached or exceeded to save power or for other reasons. When the device turns of the lights at 1506, the process 1500 may loop back to the operation 1502 and continue processing.

At 1508, (via the route "no" from the decision 1504), the electronic device 100 may turn on the front light, such as when the front light is powered on (e.g., previously turned off from the operation 1506, etc.).

At 1510, the electronic device 100 may determine whether to adjust an intensity of the front lights based at least in part on the measure light intensity from the operation 1502. The adjustment may be based on a function, a look-up table, or other data that relates measured ambient light values to light intensity settings for the light source 106. When the electronic device 100 determines to increase the intensity, such as when the measure light intensity is near the threshold, then the electronic device may increase the intensity at 1512 (via the route "increase"). When the electronic device 100 determines to maintain the intensity, such as when the intensity of the front lights is appropriate for the measure light intensity (e.g., within a threshold range), then the electronic device may maintain the intensity at 1514 (via the route "maintain"). When the electronic device 100 determines to decrease the intensity, such as when the measure light intensity is not near the threshold, then the electronic device may decrease the intensity at 1514 (via the route "decrease"). In some embodiments, a user may be able to adjust the intensity of the light source using manual controls.

The process may follow from the operations 1512, 1514, or 1516 to a decision operation 1518 to determine whether to adjust a color appearance of the blocks 110. For example, the decision operation 1518 may enable automatic color adjustment based on measured light intensity and/or characteristics of the ambient light (e.g., florescent ambient light, tint of ambient light, etc.). When the electronic device 100 determines to adjust the colors at 1518, then the electronic device may adjust a hue of one or more of the colors at 1520 (via the route "hue"). For example, the electronic device 100 may determine a change in the hue based at least in part on characteristics of the measured ambient light, which may trigger a change via the operation 1520 with or without user intervention. In accordance with the various embodiments, the electronic device 110 may change the colors by adjusting a display state of some pixels in a block (e.g., render some pixels in a grey state, near a grey state, etc.), by adjusting the light intensity of the light source, by varying an amount of white light shown on the block, by absorbing or reflecting colors in a different configuration, or by other possible techniques described herein.

When the electronic device 100 determines to maintain the colors without a change, then the electronic device may maintain the colors at 1522 (via the route "maintain"). When the electronic device 100 determines to adjust a balance of the colors, such as based on the characteristics of the measured ambient light, then the electronic device may adjust the balance of the colors at 1524 (via the route "balance"), possibly using one or more of the adjustments described immediately above. Although the process 1500 only discusses changes to the hue or balance, other colorization changes may be made that enable automatic (e.g., based on the measured ambient light) or manual (by the user) adjustment of the colors.

The process may follow from the operations 1520, 1522, or 1524 back to the operation 1502 to loop the process 1500.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An electronic device comprising:
a monochrome reflective display to render white pixels to reflect colored light, black pixels to absorb the colored light, and pixels in shades of grey to reflect a portion of the colored light;
a light source that emits white light; and
a color-patterned front light (CPFL) panel having a front surface, a rear surface, and sides that are between the front surface and the rear surface, the CPFL panel receiving the white light from the light source, filtering the white light into red light, green light, and blue light, and redirecting the red light, the green light, and the blue light onto individual pixels on the monochrome reflective display adjacent to the rear surface, the red light, the green light, and the blue light shining through the rear surface and directed onto the individual pixels as the colored light.

2. The electronic device as recited in claim 1, further comprising a light sensor to measure an amount of ambient light proximate to the front surface of the CPFL panel, and wherein the light source varies an intensity of the white light emitted based at least in part on the amount of ambient light measured by the light sensor.

3. A display assembly comprising:
a reflective display;
a light source; and
a color-patterned front light (CPFL) panel adjacent to the reflective display, the CPFL panel to receive light emitted from the light source and redirect the light onto individual pixels of the reflective display as colored light wherein the reflective display changes a color appearance of a block of pixels by performing one or more of (1) selectively absorbing the colored light by rendering individual pixels as black, (2) selectively reflecting the colored light by rendering the individual pixels as white, or (3) selectively reflecting a portion of the colored light and absorbing a portion of the colored light by rendering the individual pixels in shades of grey, and wherein the block of pixels:
change color based at least in part on the colored light being absorbed or reflected within the block of pixels;
is defined as n-by-m block of pixels, each pixel being assigned to receive one of red light, green light, blue light, or white light; and
include pixels representative of each of the red light, green light, blue light, and white light.

4. The display assembly as recited in claim 3, wherein the CPFL panel includes a light guide to shine light from the light source as collimated light across the CPFL panel, and wherein the collimated light is redirected to the reflective display by surface relief forms within the CPFL panel.

5. The display assembly as recited in claim 3, further comprising a light sensor to measure ambient light proximate to a front surface of the CPFL panel, and wherein an intensity of the light emitted from the light source varies based at least in part on the ambient light measured.

6. The display assembly as recited in claim 3, wherein the light source emits white light and wherein the CPFL panel includes filters to convert at least some of the white light into the red light, the green light, or the blue light for selective distribution to the individual pixels on the reflective display.

7. The display assembly as recited in claim 6, wherein the filters are wave guides that are associated with one or more pixels of the reflective display.

8. The display assembly as recited in claim 7, wherein the CPFL panel includes a first layer to redirect the white light onto the reflective display and a second layer to convert the white light to the colored light using the wave guides.

9. The display assembly as recited in claim 3, wherein the light source includes at least one red light source, at least one green light source, and at least one blue light source, and wherein the CPFL panel includes surface relief forms to direct the red light, the green light and the blue light onto one or more of the pixels on the reflective display.

10. The display assembly as recited in claim 9, wherein the CPFL panel includes three layers including a layer for the red light, a layer for the green light, and a layer for the blue light.

11. The display assembly as recited in claim 9, wherein the red light, the green light, and the blue light are located adjacent to different corners of the CPFL panel to shine non-collimated light into the CPFL panel for redirection onto the reflective display.

12. The display assembly as recited in claim 3, wherein the light source is integrated within the CPFL panel.

13. An apparatus comprising:
a color-patterned front light (CPFL) panel having a front surface, a rear surface and sides between the front surface and the rear surface, the CPFL panel to receive light shone through at least one side of the CPFL panel from one or more of a red light source, a green light source, and a blue light source and redirect the light using surface relief forms onto individual pixels on a reflective display located adjacent to the rear surface of the CPFL panel, the redirected light shining through the rear surface and directed onto the individual pixels as colored light, wherein the red light source, the green light source, and the blue light source are located on different sides of the CPFL panel and use light guides to shine the light into the CPFL panel as collimated light.

14. The apparatus as recited in claim 13, further comprising a white light source adjacent to the CPFL panel to shine white light into the CPFL panel.

15. The apparatus as recited in claim 13, wherein the light guides guide the light through the CPFL panel as the collimated light prior to direction by the surface relief forms.

16. The apparatus as recited in claim 13, wherein the CPFL panel further comprises filters to convert white light into one of red light, green light, or blue light prior to or after redirecting the white light onto the individual pixels using the surface relief forms.

17. The apparatus as recited in claim 13, wherein the CPFL panel includes a plurality of layers used to redirect the light of at least one color.

18. The apparatus as recited in claim 13, further comprising the reflective display.

19. A method comprising:
emitting white light through a color patterned front light (CPFL) panel that converts the white light into colored light and redirects the colored light onto a block of pixels on a reflective display, the colored light being at least one of red light, green light, or blue light;
rendering the block of pixels using the reflective display to change an appearance of a color of the block of pixels by at least one of rendering some pixels as white to reflect the colored light, rendering some pixels as black to absorb the colored light, and rendering some pixels in shades of grey to reflect a portion of the colored light.

20. The method as recited in claim 19, further comprising:
measuring an amount of ambient light proximate to the CPFL panel; and
adjusting an intensity of the white light emitted through the CPFL panel based at least in part on the amount of ambient light.

21. The method as recited in claim 19, wherein the block of pixels is an n-by-n block of pixels that includes n^2 total pixels that, following the rendering, together have the appearance of the color.

22. The method as recited in claim 19, further comprising:
measuring ambient light proximate to the CPFL panel; and
adjusting at least one of the rendering of the block of pixels or the emitting of the white light to change a characteristic of the appearance of the color of the blocks of pixels of the reflective display based at least in part on characteristics of the measured ambient light.

23. A display assembly comprising:
a reflective display;
one or more light sources that emit red light, green light and blue light; and
a color-patterned front light (CPFL) panel adjacent to the reflective display, the CPFL panel including surface relief forms in multiple layers to receive at least one of the red light, the green light or the blue light emitted from the one or more light sources and to redirect the at least one of the red light, the green light or the blue light onto the reflective display as colored light,
wherein the reflective display changes a color of a block of pixels by performing one or more of (1) selectively absorbing the colored light by rendering individual pixels as black, (2) selectively reflecting the colored light by rendering the individual pixels as white, or (3) selectively reflecting a portion of the colored light and absorbing a portion of the colored light by rendering the individual pixels in shades of grey, the block of pixels changing the color based at least in part on the colored light being absorbed or reflected within the block of pixels.

24. A method comprising:
measuring an amount of ambient light proximate to a color patterned front light (CPFL) panel;
adjusting an intensity of light emitted through the CPFL panel based at least in part on the amount of ambient light;
redirecting the light onto a block of pixels on a reflective display as colored light being at least one of red light, green light, or blue light; and
rendering the block of pixels using the reflective display to change an appearance of a color of the block of pixels by at least one of rendering some pixels as white to reflect the colored light, rendering some pixels as black to absorb the colored light, and rendering some pixels in shades of grey to reflect a portion of the colored light.

* * * * *